United States Patent
Imai et al.

(10) Patent No.: US 9,331,479 B2
(45) Date of Patent: May 3, 2016

(54) SENSOR DEVICE

(75) Inventors: Hiroshi Imai, Nara (JP); Yasuhiro Kawabata, Kyoto (JP); Hiroshi Sameshima, Nara (JP)

(73) Assignee: OMRON Corporation, Kyoto (JP)

( * ) Notice: Subject to any disclaimer, the term of this patent is extended or adjusted under 35 U.S.C. 154(b) by 456 days.

(21) Appl. No.: 13/816,863

(22) PCT Filed: Mar. 16, 2011

(86) PCT No.: PCT/JP2011/056246
§ 371 (c)(1),
(2), (4) Date: Feb. 13, 2013

(87) PCT Pub. No.: WO2012/056741
PCT Pub. Date: May 3, 2012

(65) Prior Publication Data
US 2013/0140910 A1 Jun. 6, 2013

(30) Foreign Application Priority Data
Oct. 29, 2010 (JP) .................................. 2010-244188

(51) Int. Cl.
G01D 3/10 (2006.01)
H02J 1/00 (2006.01)
H02J 1/04 (2006.01)
H02J 7/00 (2006.01)

(52) U.S. Cl.
CPC ... *H02J 1/00* (2013.01); *G01D 3/10* (2013.01); *H02J 1/04* (2013.01); *H02J 7/0065* (2013.01); Y10T 307/766 (2015.04)

(58) Field of Classification Search
CPC ........... H04W 52/02; H02J 1/102; H02J 1/00; H02M 1/10; G01D 3/10
See application file for complete search history.

(56) References Cited

U.S. PATENT DOCUMENTS 5,499,187 A * 3/1996 Smith ........................... 363/142
6,225,708 B1 * 5/2001 Furukawa et al. ............... 307/66
6,856,047 B2 * 2/2005 Murabayashi et al. ....... 307/150

(Continued)

FOREIGN PATENT DOCUMENTS

EP 0949739 * 9/1999 ................ H02J 3/38
EP 0 949 739 A2 10/1999

(Continued)

OTHER PUBLICATIONS

Japanese Information Offer Form in corresponding Japanese Application No. 2010-244188 dated Jul. 25, 2012 (3 pages).

(Continued)

*Primary Examiner* — Thienvu Tran
*Assistant Examiner* — Pinping Sun
(74) *Attorney, Agent, or Firm* — Osha Liang LLP

(57) ABSTRACT

A sensor device has a sensor unit, a control unit; and multiple power supply paths from a power supply to the sensor unit and the control unit. The multiple power supply paths are configured to be switched in accordance with an operation status of the sensor unit. The sensor device further has a wireless communication device for transmitting a measurement result of the sensor unit. The multiple power supply paths are provided to supply power from the power supply to the wireless communication device. The multiple power supply paths are configured to be switched in accordance with an operation status of the wireless communication device.

5 Claims, 13 Drawing Sheets

(56) References Cited

U.S. PATENT DOCUMENTS

| | | | |
|---|---|---|---|
| 7,424,315 B2* | 9/2008 | Heuts et al. | 455/574 |
| 7,680,612 B2* | 3/2010 | Oohasi et al. | 702/57 |
| 8,421,436 B2* | 4/2013 | Kim et al. | 323/351 |

FOREIGN PATENT DOCUMENTS

| | | | | |
|---|---|---|---|---|
| JP | 7-273715 | | 10/1995 | |
| JP | 11-41825 | A | 2/1999 | |
| JP | 11-353040 | A | 12/1999 | |
| JP | 2005-339078 | * | 12/2005 | G08C 17/00 |
| JP | 2005-339078 | A | 12/2005 | |
| JP | 2007-235394 | * | 9/2007 | H04B 7/26 |
| JP | 2007-243478 | A | 9/2007 | |
| JP | 2007-316770 | A | 12/2007 | |
| JP | 2011-55186 | | 3/2011 | |

OTHER PUBLICATIONS

International Search Report issued in PCT/JP2011/056246 mailed Jun. 7, 2011 (2 pages).

* cited by examiner

SENSOR DEVICE

BACKGROUND

1. Technical Field

The present invention is a sensor device for measuring various kinds of measurement subjects such as temperature and humidity.

2. Background Art

In our surrounding environment, various kinds of sensors are installed, and measurement data obtained with a sensor are transmitted to a server device (or a main body device), and are analyzed by the server device. Then, using this analysis result, devices and the like installed in the surrounding environment are controlled.

When the sensor frequently measures and transmits data, the sensor naturally consumes more power. For example, when the sensor is operated with a battery, and the sensor frequently measures and transmits data, the lifetime of the battery is reduced, and it is necessary to frequently replace the battery.

On the other hand, a technique for reducing the power consumption of a generally-used electronic device is known. For example, Patent Document 1 indicates that a battery and direct current voltage conversion means for generating a direct current voltage which is less than a battery voltage are provided, and the direct current voltage generated by the direct current voltage conversion means is used in a main-driving status in which the power consumption is high (when the main-driving/standby status signal is a main-driving status), and a battery voltage is used in a standby status in which the power consumption is low (when the main-driving/standby status signal is a standby status). Accordingly, in the main-driving status in which the power consumption is high, the direct current voltage conversion means provides a voltage lower than the battery voltage to reduce the loss of power. In the standby status in which the power consumption is low, the operation of the direct current voltage conversion means is stopped, so that the loss of power can be reduced to zero in the direct current voltage conversion means. Patent Document 2 indicates conversion of a power supply voltage in accordance with a mode signal indicating an operation mode of a semiconductor device.

PATENT DOCUMENTS

Patent Document 1: Japanese Unexamined Patent Publication No. H11-41825 (published on Feb. 12, 1999)
Patent Document 2: Japanese Unexamined Patent Publication No. H11-353040 (published on Dec. 24, 1999)

SUMMARY OF THE INVENTION

The techniques of Patent Document 1 and Patent Document 2 may be considered to be applied to the sensor device. However, in Patent Document 1 and Patent Document 2, the mode signal and the main-driving/standby status signal for setting the mode are used, and therefore, it is impossible to simply apply them to the sensor device. More specifically, the operation mode of the sensor device cannot be set from the outside in accordance with the installation environment thereof and the measurement subject. For example, when a sensor device performs measurement under predetermined environment, the operation mode is changed when surrounding environment becomes the predetermined environment, and is not changed by an externally input signal.

One or more embodiments of the present invention provides a sensor device capable of reducing the power consumption even though the operation status of the sensor device may change in accordance with, e.g., installation environment.

According to one or more embodiments of the present invention, a sensor device has a sensor unit and a control unit, wherein the sensor device includes multiple power supply paths from a power supply to the sensor unit and the control unit, and these power supply paths can be switched in accordance with an operation status of the sensor unit.

According to the configuration, the power supply path is switched in accordance with the operation mode of the sensor device (power supply switch), so that an optimum power supply path is selected, and the power consumption can be reduced. The power supply switch is not to switch the power supply using the mode signal and the main-driving/standby status signal for setting the operation mode, and can be performed in accordance with the operation status of the device itself (the output signal of the wireless communication device and the sensor unit). More specifically, the power consumption can be reduced even though the operation status of the sensor device may change in accordance with, e.g., installation environment.

According to one or more embodiments of the present invention, a sensor device has a sensor unit and a control unit, wherein the sensor device includes multiple power supply paths from a power supply to the sensor unit and the control unit, and these power supply paths can be switched in accordance with an operation status of the sensor unit.

Therefore, the power supply path is switched in accordance with the operation mode of the sensor device (power supply switch), so that an optimum power supply path is selected, and the power consumption can be reduced. In addition, the power supply is switched in accordance with the operation status of the device itself (output signal of sensor unit), so that even though a sensor device changes the operation status in accordance with the installation environment and the like, the power consumption can be reduced.

DETAILED DESCRIPTION

Embodiments of the present invention will be explained with reference to FIGS. 1 to 13 as follows. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
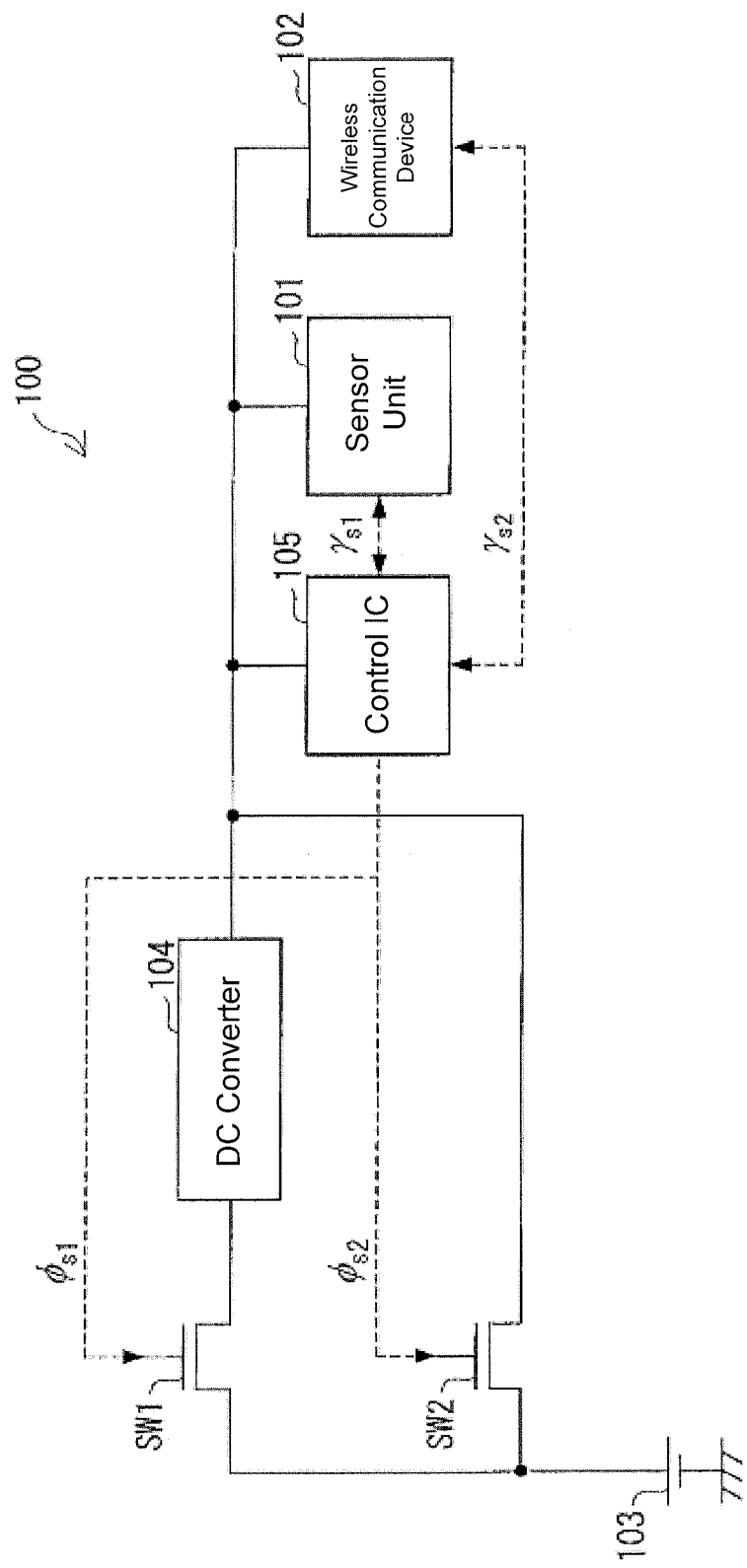
FIG. 1 is a block diagram illustrating schematic configuration of a sensor device according to one or more embodiments of the present invention.

FIG. 1 is a block diagram illustrating schematic configuration of a sensor device according to one or more embodiments of the present invention. As illustrated in FIG. 1, a sensor device 100 according to one or more embodiments of the present invention includes a sensor unit 101, a wireless communication device 102, a direct current power supply 103, a DC converter 104, a control IC (control unit) 105, and a switch SW1/SW2.

The sensor device 100 uses the sensor unit 101 to measure a measurement subject such as temperature and humidity, and uses the wireless communication device 102 to transmit measurement data obtained from the measurement to a server device and the like. The sensor device 100 executes measurement processing and transmission processing with configured timing.

The direct current power supply 103 is, for example, a finite power supply source such as a battery, but the present invention is not limited thereto. When the direct current power supply 103 is a battery, this greatly contributes to the purpose of prolonging the lifetime of the battery, but even though the direct current power supply 103 is not a finite power supply source, the effect of reducing the power consumption can be obtained in one or more embodiments of the present invention. Power provided from the direct current power supply 103 to the sensor unit 101, the wireless communication device 102, and the control IC 105 is provided through one of two power supply paths. More specifically, one of them is a path for supplying power from the direct current power supply 103 via the DC converter 104, and the other of them is a path for directly supplying power from the direct current power supply 103. These power supply paths are switched in accordance with the ON/OFF status of the switches SW1 and SW2. In one or more embodiments of the present invention, the DC converter 104 is a step-down-type DC converter.

The control IC 105 controls the sensor device 100, and controls operation of the sensor unit 101 and the wireless communication unit 102 and switches and controls the ON/OFF status of the switches SW1 and SW2. In FIG. 1, $\gamma_{s1}$ denotes a sensor-control IC signal, $\gamma_{s2}$ is a wireless communication device-control IC signal, and $\phi_{s1}/\phi_{s2}$ denotes a switch operation signal.

In the sensor device 100, the finite power supply source is used as the direct current power supply 103, and therefore, it is important to reduce the power consumption and prolong the lifetime of the power supply. In the sensor device 100, the power supply path is switched in accordance with the operation mode, so that the power consumption is reduced.

More specifically, the operation modes of the sensor device 100 include a sensing mode for performing measurement with the sensor unit 101, a transmission mode for transmitting measurement data with the wireless communication device 102, and a sleep mode for performing neither measurement nor transmission. In the sensing mode and the transmission mode, the sensor device 100 provides power via the DC converter 104, and in the sleep mode, the sensor device 100 directly provides power from the direct current power supply 103. This is because of the following reasons.

When power is provided via the DC converter 104, the electric current conversion efficiency is high in a region where the output voltage is high, and the electric current conversion efficiency is low in a region where the output voltage is low. In the sensing mode or the transmission mode, a relatively high electric current is required for operation of the sensor unit 101 or the wireless communication device 102, and therefore the DC converter 104 can be driven in a status in which the electric current conversion efficiency is high. When power is directly provided to the sensor unit 101 from the direct current power supply 103 such as a battery, the accuracy of the sensor is reduced as the battery voltage decreases. Therefore, all the battery capacity cannot be completely used when the accuracy of the sensor is to be maintained. When power is provided via the DC converter 104, power can be stably provided to the sensor unit 101 without voltage change, and all the battery capacity can be completely used while the detection accuracy of the sensor is maintained. Further, when the DC converter 104 is a step-down converter, the operation voltage of the control IC 105 can be a voltage close to the lower limit of the rated usage voltage, and the power consumption by the control IC 105 can be reduced.

On the other hand, in the sleep mode, it is not necessary to operate the sensor unit 101 and the wireless communication device 102, and therefore, the output electric current decreases. By stopping the DC converter 104, the operation power of the DC converter 104 can be reduced.

As described above, the sensor device 100 according to one or more embodiments of the present invention is configured to reduce the power consumption by switching the power supply path in accordance with the operation mode, and in particular, the sensor device 100 according to one or more embodiments of the present invention is characterized in the switch algorithm of the power supply path (power supply switch algorithm). Hereinafter, an example of this algorithm will be explained with reference to FIG. 2.

Figure 2:
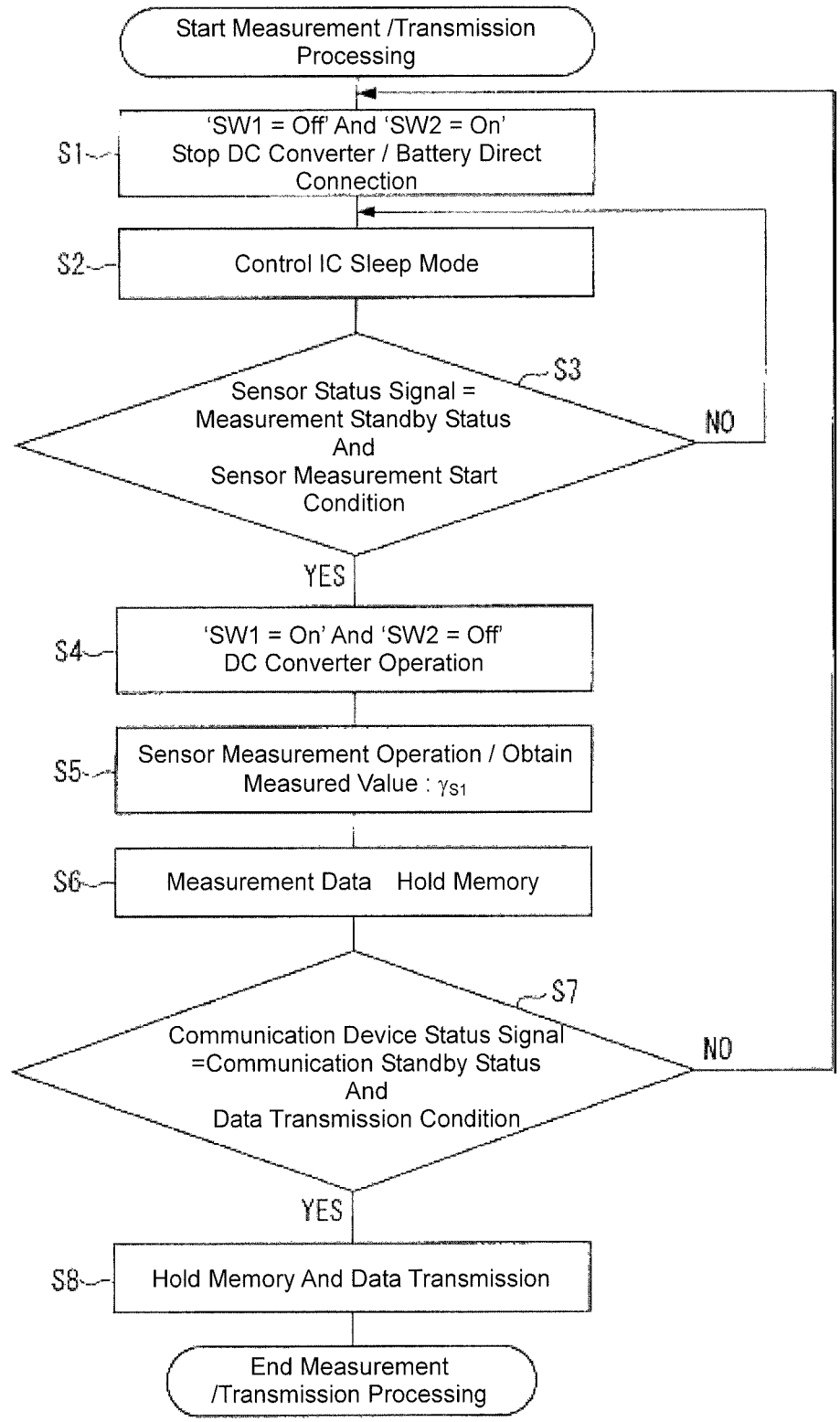
FIG. 2 is a flowchart illustrating power supply switching algorithm according to one or more embodiments of the present invention.

In the flowchart as illustrated in FIG. 2, first, the device goes into the sleep mode. More specifically, the control IC 105 turns off the switch SW1 and turns on the switch SW2 (S1). Accordingly, the DC converter 104 stops, and power is directly provided to the sensor unit 101, the wireless communication device 102, and the control IC 105 from the direct current power supply 103 (battery direct connection). Accordingly, the sensor device 100 goes to the sleep mode (S2). When the switch SW1 is turned off, power is no longer provided to the DC converter 104 itself, and in the sleep mode, the DC converter 104 stops.

In the sleep mode, the control IC 105 monitors a sensor status signal and a communication device status signal to go into the sensing mode and the transmission mode with appropriate timing. When the sensor status signal is in a measurement standby status, and the sensor measurement start condition is satisfied (Yes in S3), the control IC 105 determines that it is possible to go to the sensing mode, and turns on the switch SW1 and turns off the switch SW2 (S4). Accordingly, the DC converter 104 operates, and power is provided to the sensor unit 101, the wireless communication device 102, and the control IC 105 via the DC converter 104.

When the device thus goes to the sensing mode, the sensor unit 101 starts measurement operation, and obtains the measured value (S5). The obtained measurement data are held in a memory (S6).

When the sensing mode is finished, a determination is made as to whether it is possible to subsequently go into the transmission mode. When the communication device status signal is the communication standby status, and the data transmission condition is satisfied (Yes in S7), the control IC 105 determines that it is possible to go to the transmission mode. In the transmission mode, the wireless communication device 102 transmits the measurement data stored in the memory (S8). It should be noted when it is not possible to go to the transmission mode due to, e.g., deterioration of the communication status (No in S7), the data transmission is not performed at that moment, and the device returns back to the sleep mode (returns back to S1).

In the above flow, when the sensor status signal is the measurement standby status, and the sensor measurement start condition is satisfied, it is determined that the device can go to the sensing mode.

In this case, "the sensor status signal is in the measurement standby status" means a status in which the sensor can measure a value of surrounding environment, to be measured, within a predetermined tolerable error range. More specifically, the following statuses can be considered.

(1) The power supply voltage is within the predetermined range. Within a measurement time, it is within a power supply voltage of a predetermined range.

(2) The environment of the detection unit of the sensor is the same as the surrounding environment of the measurement subject within a tolerable error range.

Example

In a case of a temperature sensor, when the temperature of the surrounding environment suddenly changes, the temperature of the detection unit follows change of the surrounding environment with a delay, because the detection unit has heat capacity. One of requirements for satisfying the measurement standby status is a status in which the temperature of the detection unit is within a tolerable error with respect to the surrounding environment. This is also applicable to a humidity sensor, a $CO_2$ sensor, and the like.

In a case of an acceleration sensor, it may be desired to obtain a signal of a certain frequency (for example, in a case where it is to detect vibration caused by operation of a fixed interval such as the number of particular vibrations caused by a motor and the like). In order to selectively extract a signal of a particular cycle, it is necessary to perform measurement with a sampling cycle at least twice as high as the frequency of the measurement subject, and in order to determine this sampling cycle, sampling may be performed at a high speed in advance. The status where the sensor is configured with the cycle of this sampling using the result of this advance sampling is one of requirements for satisfying the measurement standby status.

(3) The noise of the surrounding environment is equal to or less than a predetermined level within the measurement time.

Depending on the measurement subject, noise may be generated to cause error in the measurement. This noise level is measured by another sensor, and the status where the noise level is at a level equal to or less than a tolerable level is one of requirements for satisfying the measurement standby status. For example, when strong electromagnetic noise is radiated in proximity to the sensor (such as a cellular phone), this may change the power supply voltage of the sensor, and may deteriorate the accuracy of the sensor measurement. The electromagnetic level can be measured with another sensor, a radio transceiver, and the like, to determine the measurement standby status of the sensor.

The sensor status signal is generated by performing measurement in advance to determine whether the above statuses (1) to (3) are satisfied. Alternatively, it may be generated through learning of previous measurement results. For example, when the temperature changes rapidly, delay of measurement timing caused by change of the temperature of the detection unit may be calculated from the previous measurement result, and a signal for changing the sensor status signal into the measurement standby status may be generated.

It should be noted that "the sensor measurement start condition is satisfied" means that it is now the time to perform sensing. In this condition, measurement performed at a regular time interval is also included, but, for example, subsequent measurement timing may be generated from the tendency of previous measurement result, or measurement timing can be generated in accordance with a measurement signal given from another sensor. It may also be possible to receive a signal from another node or server and set the measurement start condition. When the sensor measurement start condition is satisfied, a signal indicating that effect is generated by the sensor unit 101, and transmitted to the control IC 105.

"The communication device status signal is in the communication standby status" means the status where the following three points are ensured:

(1) the status of the wireless communication device provided in the node in question is a status ready for communication, (2) the status of the communication device at the reception side (server/another node) is a status ready for communication, and (3) wireless communication path is ready for communication.

More specifically, the following statuses can be considered.

The status (1) is as follows.

The power supply voltage provided to the communication device is within the predetermined range. Within a communication time, it is within a power supply voltage of a predetermined range.

Connection information about connection with the reception side communication device is held. For example, in a case of WiFi wireless, it is necessary to have an IP address and a port number of the reception side communication device, a wireless communication channel, and the like. When the node is in sleep status, the wireless communication device may be turned off to save power consumption, and therefore, this condition is required when, e.g., it is necessary to obtain the connection information again when the power is turned on.

The status (2) requires that the power supply voltage at the reception device side is within a predetermined range like the above. It is also necessary to hold the connection information.

The status (3) is as follows.

The band width of the wireless communication can be ensured. When the communication frequency band width is occupied by another device using the wireless communication device of the same frequency band or another node, the communication may not be established.

Even when the communication environment is deteriorated due to obstacles and the like, the radio transmission/reception strength that allows communication can be ensured. When the environment changes due to movement of people and obstacles, there may be a change in a time axis direction.

The communication standby status signal is generated as to whether the above three statuses are satisfied or not from, e.g., the previous transmission result, a test of the communication path before the transmission, or prediction from previous transmission status.

"The data transmission condition is satisfied" means that it is now the time to perform data transmission. In this condition, transmission performed at a regular time interval is also included like the sensor measurement start condition, but, for example, subsequent transmission timing may be generated from the tendency of previous measurement result, or transmission timing may be generated in accordance with a measurement signal given from another sensor. It may also be possible to receive a signal from another node or server and set the data transmission condition. When the data transmission condition is satisfied, a signal indicating that effect is transmitted from the wireless communication unit to the control IC 105.

Figure 3:
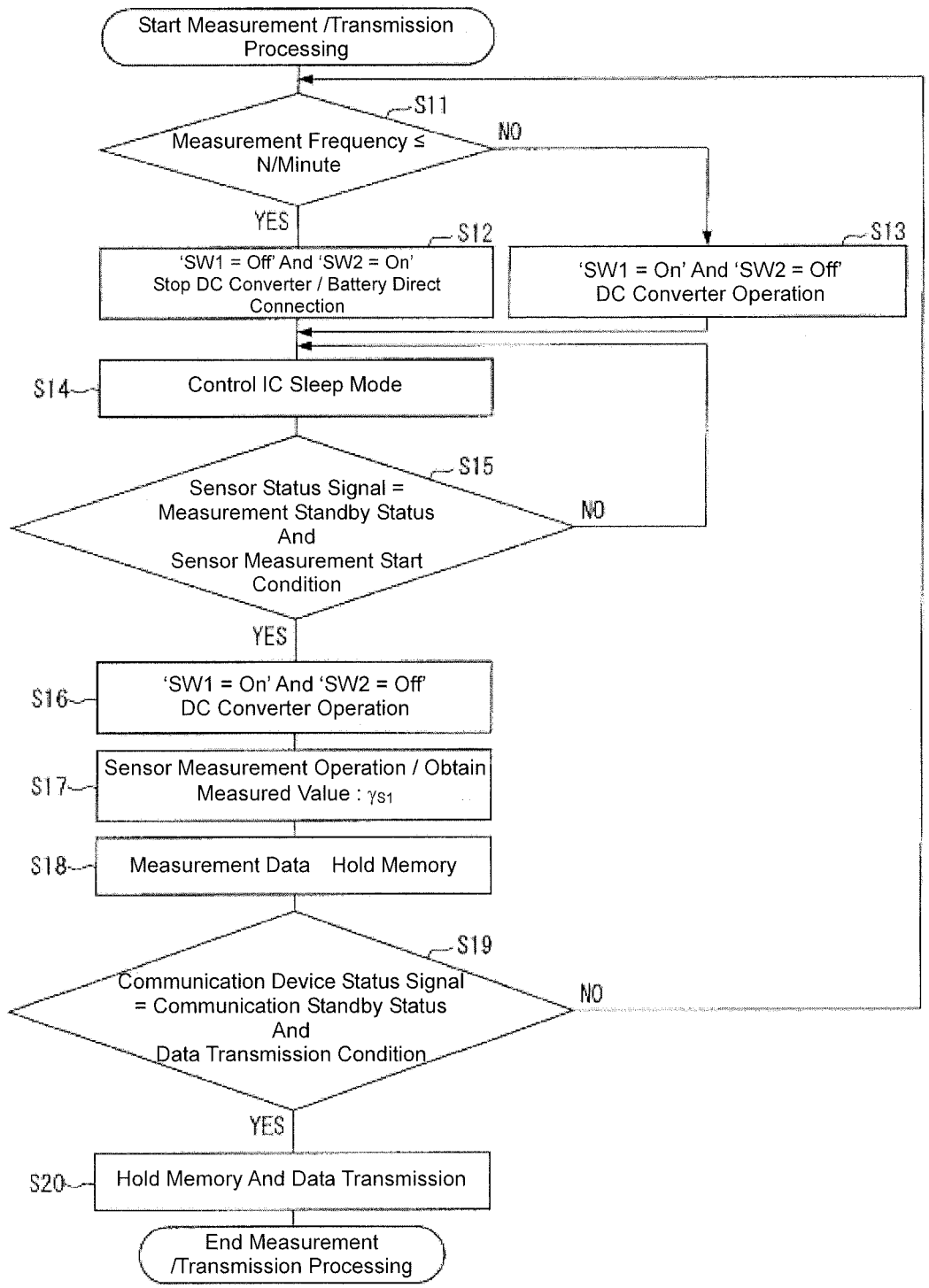
FIG. 3 is a flowchart illustrating power supply switching algorithm according to one or more embodiments of the present invention.

FIG. 3 is a flowchart illustrating algorithm where power supply is switched based on a measurement frequency. In this algorithm, the measurement frequency is set at any value, and the power supply is switched on the basis of the measurement frequency. It should be noted that the measurement frequency can also be set from outside via, for example, the wireless communication device 102.

In the flowchart as illustrated in FIG. 3, first, the device also goes into the sleep mode. In this algorithm, whether power is supplied or not in the sleep mode is determined in accordance with whether the measurement frequency is equal to or less than a threshold (N/minute).

When the measurement frequency is equal to or less than the threshold (N/minute) (Yes in S11), the measurement frequency is low, and the operation mode is not changed so frequently, and therefore, the power consumption can be effectively reduced by stopping the DC converter 104 in the sleep mode. For this reason, when the measurement frequency is equal to or less than the threshold (N/minute), the control IC 105 turns off the switch SW1, and turns on the switch SW2 (S12). Accordingly, the DC converter 104 stops, and the sensor device 100 goes to the sleep mode (S14).

On the other hand, when the measurement frequency is not equal to or less than the threshold (N/minute) (No in S11), the measurement frequency is high, and the operation mode is changed frequently. In such a case, the power supply path is switched in accordance with change of the operation mode, the power consumption by the switching of the switch is increased, and as a whole, it may be impossible to obtain the effect of reduction of the power consumption. For this reason, when the measurement frequency is not equal to or less than the threshold (N/minute), the control IC 105 turns on the switch SW1, and turns off the switch SW2 (S13), and goes into the sleep mode (S14). More specifically, also in the sleep mode, the power is supplied via the DC converter 104.

In the flow of FIG. 3, the processing of S15 to S20 is the same as the processing of S3 to S8 in FIG. 2, and therefore, detailed description thereabout is omitted.

Figure 4:
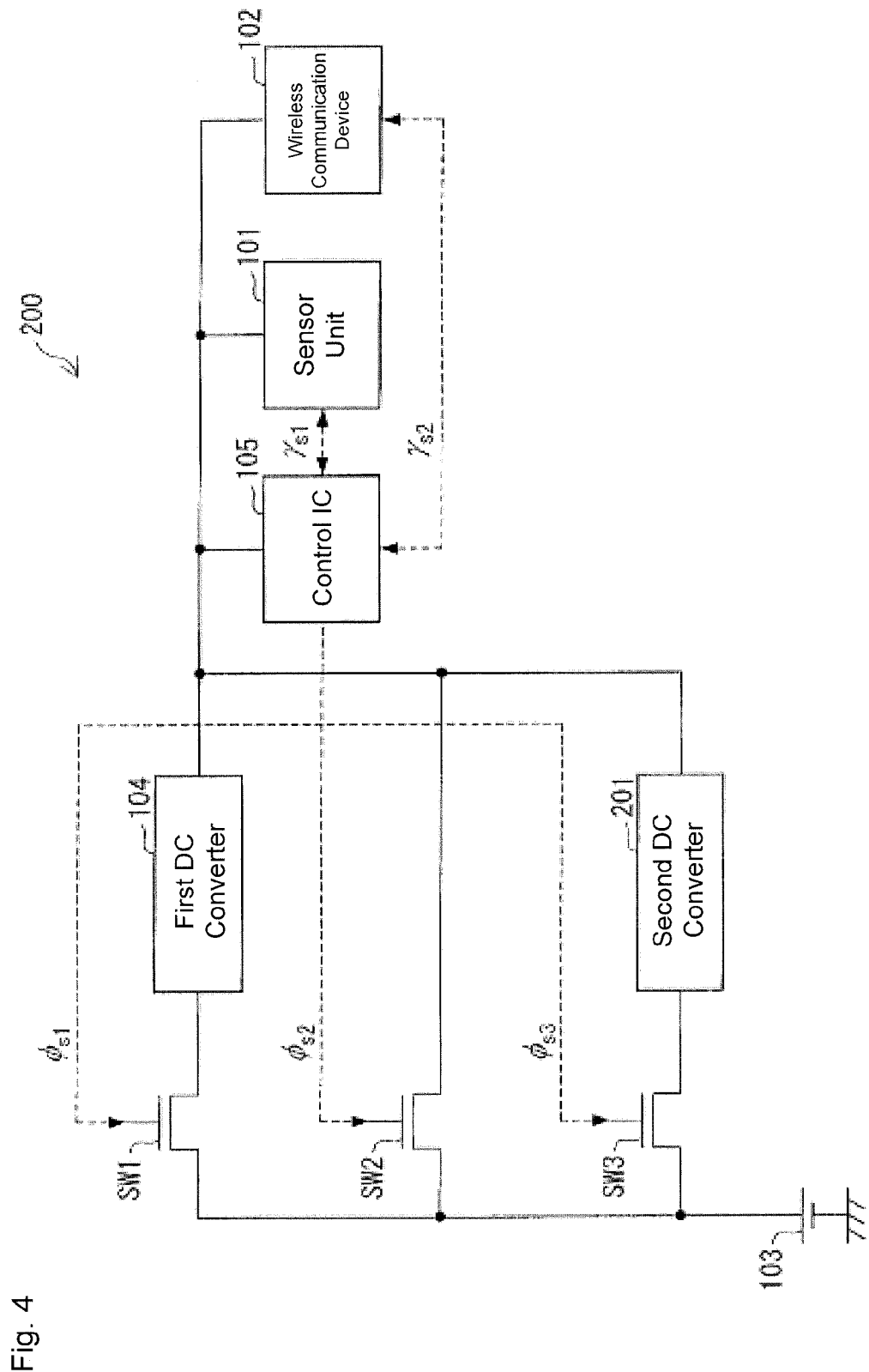
FIG. 4 is a block diagram illustrating schematic configuration of a sensor device according to one or more embodiments of the present invention.

FIG. 4 is a block diagram illustrating schematic configuration of the sensor device according to one or more embodiments of the present invention. When, in particular, this sensor device 200 switches the power supply on the basis of sensing accuracy, the sensor device 200 is configured to be able to obtain a significant effect of reduction of the power consumption. The sensor device 200 of FIG. 4 has a configuration similar to the sensor device 100 of FIG. 1, but is configured such that a switch SW3 and a second DC converter 201 are connected in series between the direct current power supply 103 and the sensor unit 101, the wireless communication device 102, and the control IC 105. In the explanation below, the DC converter 104 will be referred to as a first DC converter 104. The second DC converter 201 is a step-up-type DC converter.

Figure 5:
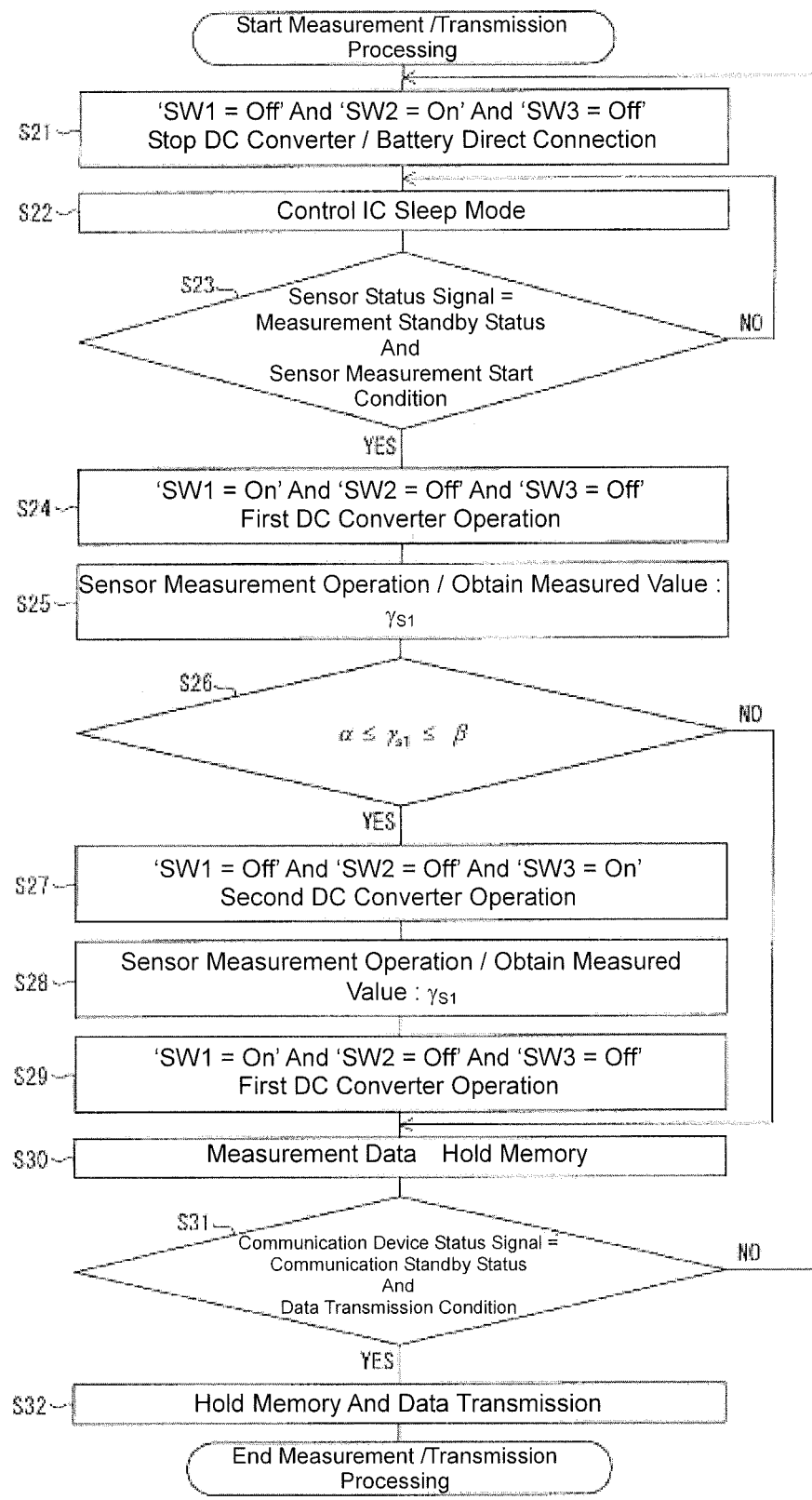
FIG. 5 is a flowchart illustrating power supply switching algorithm according to one or more embodiments of the present invention.

FIG. 5 is a flowchart illustrating algorithm where power supply is switched based on sensing accuracy. Suppose that, in one or more embodiments of the present invention, for example, it is desired to perform measurement with a high degree of accuracy in a range where the measurement range is $\alpha$ to $\beta$. In order to satisfy this demand, the sensor device 200 of FIG. 4 provides power via the second DC converter 201 in the range where the measurement range is $\alpha$ to $\beta$. This is because, in general, sensors and the like perform analogue operation, and when the operation voltage is set at a high level, the measurement error is reduced, and the measurement can be performed with a high degree of accuracy.

In the flowchart as illustrated in FIG. 5, first, the device also goes into the sleep mode. More specifically, the control IC 105 turns off the switches SW1 and SW3 and turns on the switch SW2 (S21). Accordingly, the first and second DC converters 104/201 stop, and power is directly provided from the direct current power supply 103 to the sensor unit 101, the wireless communication device 102, and the control IC 105 (battery direct connection). Accordingly, the sensor device 200 goes to the sleep mode (S22).

In the sleep mode, the control IC 105 monitors a sensor status signal and a communication device status signal to go into the sensing mode and the transmission mode with appropriate timing. When the sensor status signal is in a measurement standby status, and the sensor measurement start condition is satisfied (Yes in S23), the control IC 105 determines that it is possible to go to the sensing mode, and turns on the switch SW1 and turns off the switches SW2 and SW3 (S24). Accordingly, the first DC converter 104 operates, and power is provided via the first DC converter 104, which is a step-down-type DC converter, to the sensor unit 101, the wireless communication device 102, and the control IC 105.

When the device thus goes to the sensing mode, the sensor unit 101 starts measurement operation, and obtains the measured value (S25). However, the measured value obtained in S25 is obtained with the power supply provided via the first DC converter 104, and the measurement data are not obtained by measurement with a high degree of accuracy. For this reason, a determination is made as to whether the measured value $\gamma_{s1}$ obtained in S25 satisfies $\alpha \leq \gamma_{s1} \leq \beta$ or not (S26).

When $\alpha \leq \gamma_{s1} \leq \beta$ holds (Yes in S26), the measurement is performed with a high degree of accuracy in this range, and therefore, the switches SW1 and SW2 are turned off, and the switch SW3 is turned on (S27). Accordingly, the second DC converter 201 operates, and power is provided via the second DC converter 201, which is a step-up-type DC converter, to the sensor unit 101, the wireless communication device 102, and the control IC 105.

In this status, the sensor unit 101 starts the measurement operation again, and obtains the measured value (S28). Further, the switch SW1 is turned on and the switches SW2 and SW3 are turned off (S29). Thus, the first DC converter is caused to operate, and the measurement data obtained in S28 are stored in the memory (S30). When $\alpha \le \gamma_{s1} \le \beta$ does not hold in S26, the measurement need not be performed with a high degree of accuracy, and accordingly, the measurement data obtained in S25 are held in the memory (S30).

When the sensing mode is thus finished, a determination is made as to whether it is possible to subsequently go into the transmission mode. Then it is determined that it is possible to subsequently go into the transmission mode, processing of the transmission mode is performed (S31 to S32). The processing of S31 to S32 is the same as the processing of S7 to S8 in FIG. 2, and therefore, detailed description thereabout is omitted.

Figure 6:
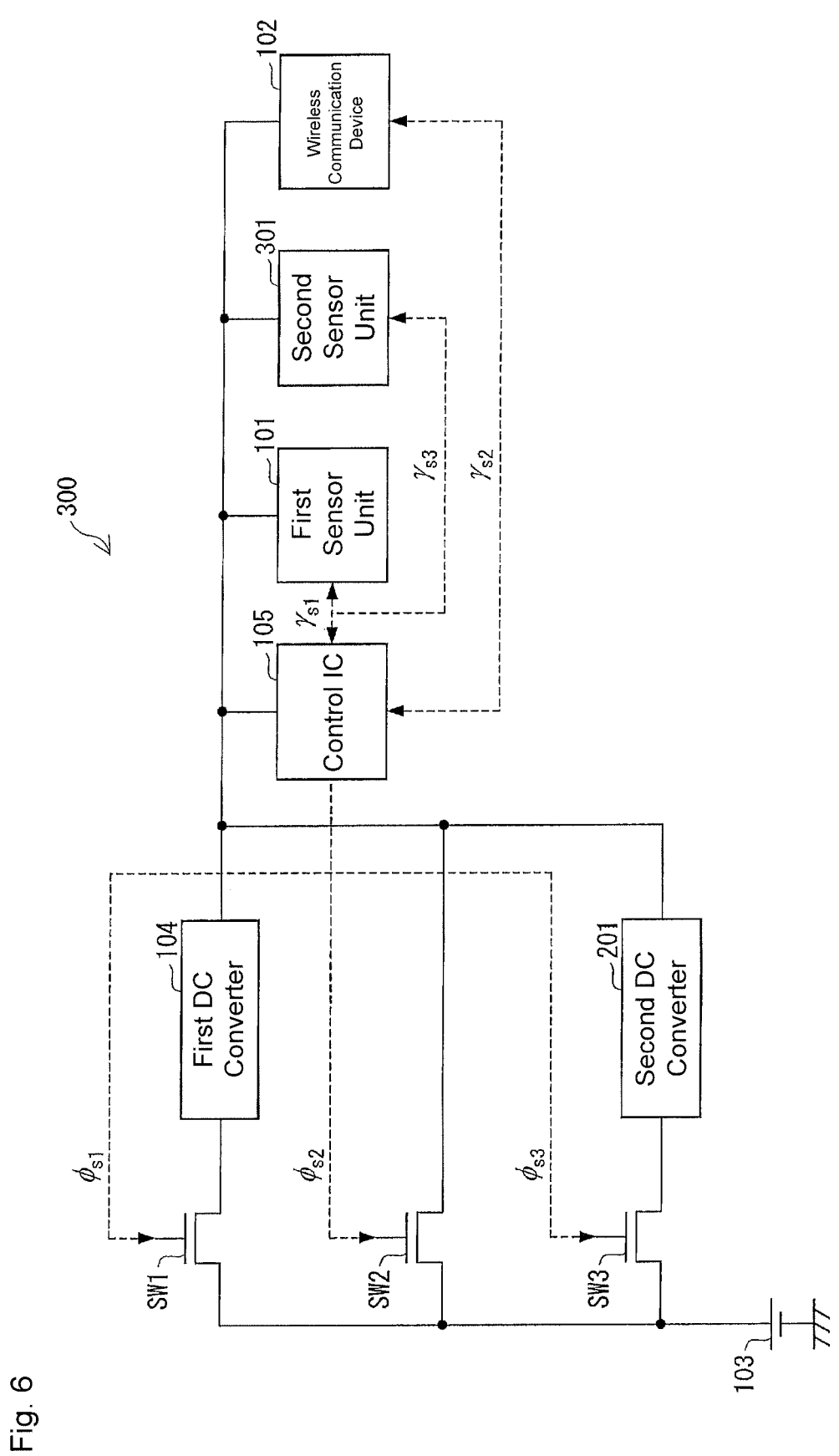
FIG. 6 is a block diagram illustrating schematic configuration of a sensor device according to one or more embodiments of the present invention.

FIG. 6 is a block diagram illustrating schematic configuration of a sensor device according to one or more embodiments of the present invention. When, in particular, this sensor device 300 switches the power supply on the basis of sensing accuracy, the sensor device 300 is configured to be able to obtain a significant effect of reduction of the power consumption, but is different from the sensor device 200 of FIG. 4 in that multiple sensor units are provided in the sensor device 300. The sensor device 300 of FIG. 6 is configured in a similar manner to the sensor device 200 of FIG. 4, but further includes a second sensor unit 301. In the explanation below, the sensor unit 101 will be referred to as a first sensor unit 101. The first sensor unit 101 and the second sensor unit 301 are sensors of different types, for example, a temperature sensor and a humidity sensor, respectively.

Figure 7:
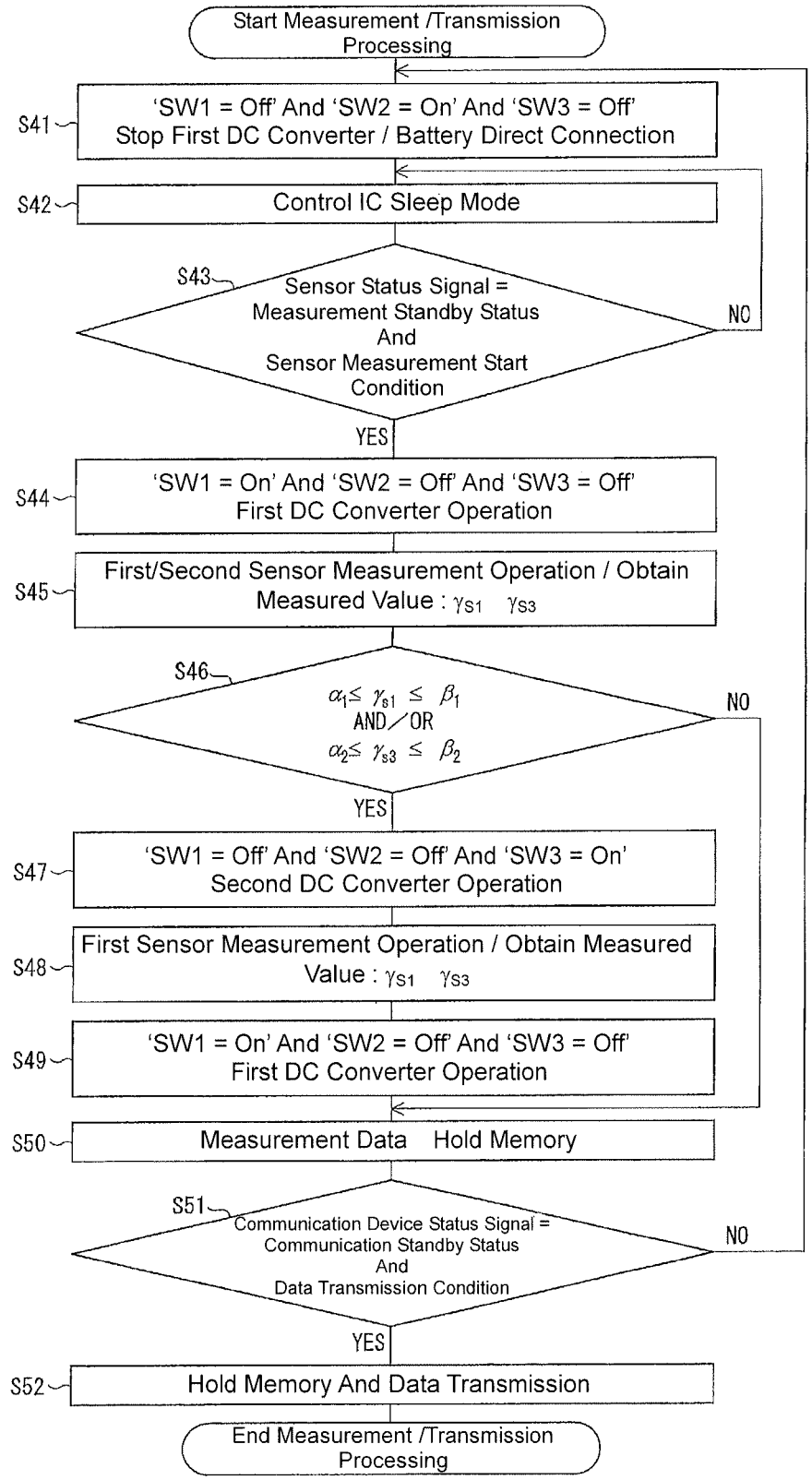
FIG. 7 is a flowchart illustrating power supply switching algorithm according to one or more embodiments of the present invention.

FIG. 7 is a flowchart illustrating algorithm where power supply is switched based on sensing accuracy. In one or more embodiments of the present invention, for example, the first sensor unit 101 is required to perform measurement with a high degree of accuracy in a range where the measurement range is $\alpha_1$ to $\beta_1$, and the second sensor unit 301 is required to perform measurement with a high degree of accuracy in a range where the measurement range is $\alpha_2$ to $\beta_2$. In order to satisfy this demand, the sensor device 300 of FIG. 6 provides power via the second DC converter 201 in a range where the measured value of the first sensor unit 101 is $\alpha_1$ to $\beta_1$ or in a range where the measured value of the second sensor unit 301 is $\alpha_2$ to $\beta_2$.

In the flowchart as illustrated in FIG. 7, first, the device also goes into the sleep mode. More specifically, the control IC 105 turns off the switches SW1 and SW3 and turns on the switch SW2 (S41). Accordingly, the first and second DC converters 104/201 stop, and power is directly provided from the direct current power supply 103 to the first sensor unit 101, the second sensor unit 301, the wireless communication device 102, and the control IC 105 (battery direct connection). Accordingly, the sensor device 300 goes to the sleep mode (S42).

In the sleep mode, the control IC 105 monitors a sensor status signal and a communication device status signal to go into the sensing mode and the transmission mode with appropriate timing. When the sensor status signal is in a measurement standby status, and the sensor measurement start condition is satisfied (Yes in S43), the control IC 105 determines that it is possible to go to the sensing mode, and turns on the switch SW1 and turns off the switches SW2 and SW3 (S44). Accordingly, the first DC converter 104 operates, and power is provided via the first DC converter 104, which is a step-down-type DC converter, to the first sensor unit 101, the second sensor unit 301, the wireless communication device 102, and the control IC 105.

When the device thus goes to the sensing mode, the first sensor unit 101 and the second sensor unit 301 start measurement operation, and obtain the measured values (S45). However, the measured values obtained in S45 are obtained with the power supply provided via the first DC converter 104, and the measurement data are not obtained by measurement with a high degree of accuracy. For this reason, a determination is made as to whether the measured values $\gamma_{s1}$, $\gamma_{s3}$ obtained in S45 satisfy $\alpha_1 \le \gamma_{s1} \le \beta_1$ or $\alpha_2 \le \gamma_{s3} \le \beta_2$ or not (S46).

When $\alpha_1 \le \gamma_{s1} \le \beta_1$ or $\alpha_2 \le \gamma_{s3} \le \beta_2$ is satisfied (Yes in S46), at least one of the first sensor unit 101 and the second sensor unit 301 requires measurement with a high degree of accuracy, and accordingly, the switches SW1 and SW2 are turned off, and the switch SW3 is turned on (S47). Accordingly, the second DC converter 201 operates, and power is provided via the second DC converter 201, which is a step-up-type DC converter, to the first sensor unit 101, the second sensor unit 301, the wireless communication device 102, and the control IC 105.

In this status, the first sensor unit 101 and the second sensor unit 301 start the measurement operation again, and obtain the measured value (S48). Further, the switch SW1 is turned on and the switches SW2 and SW3 are turned off (S49). Thus, the first DC converter is caused to operate, and the measurement data obtained in S48 are stored in the memory (S50). When the determination condition is not satisfied in S46, the measurement need not be performed with a high degree of accuracy, and accordingly, the measurement data obtained in S45 are held in the memory (S50).

When the sensing mode is thus finished, a determination is made as to whether it is possible to subsequently go into the transmission mode. When it is determined that it is possible to subsequently go into the transmission mode, processing of the transmission mode is performed (S51 to S52). The processing of S51 to S52 is the same as the processing of S7 to S8 in FIG. 2, and therefore, detailed description thereabout is omitted.

Figure 8:
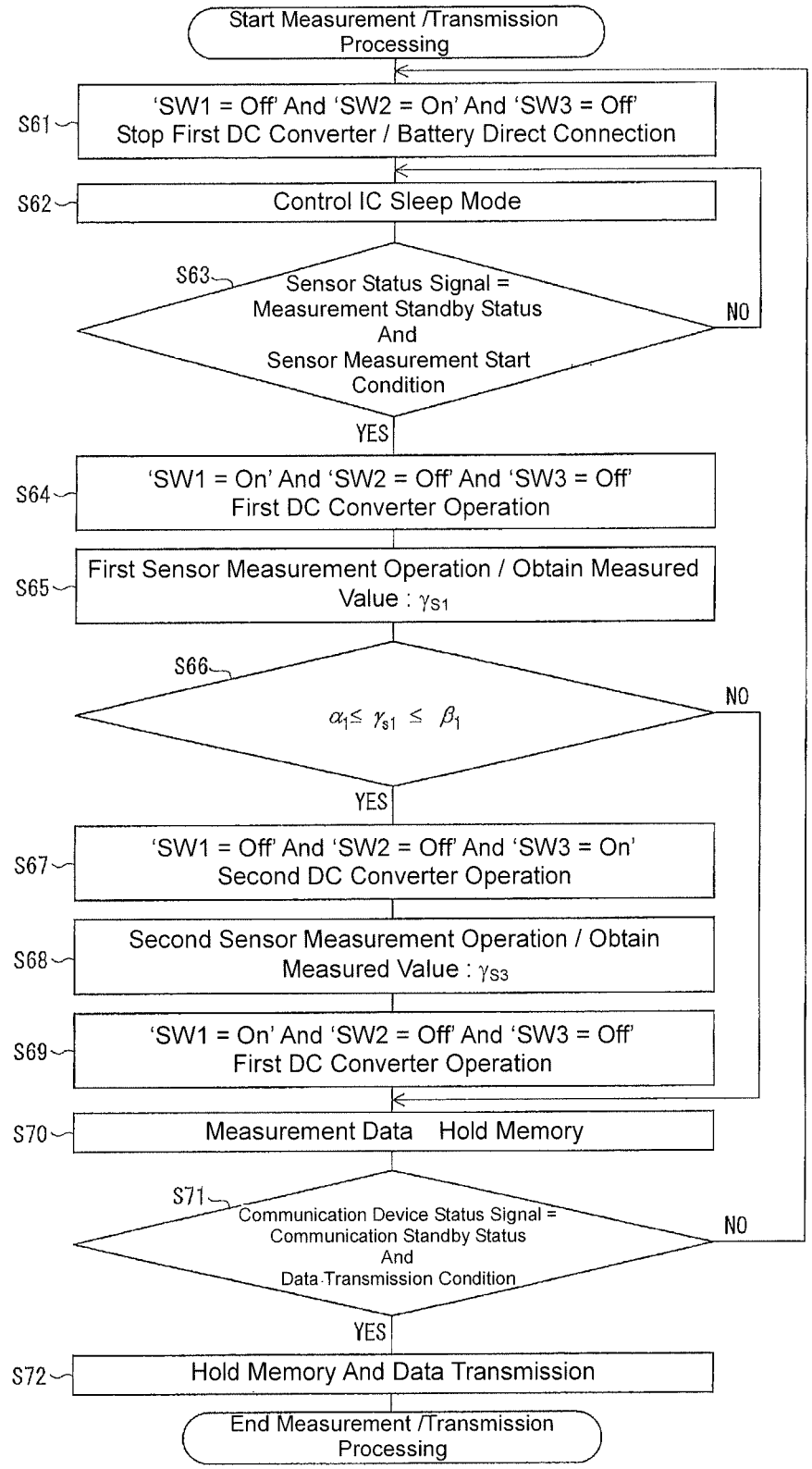
FIG. 8 is a flowchart illustrating power supply switching algorithm according to one or more embodiments of the present invention.

FIG. 8 is a flowchart illustrating another algorithm where power supply is switched based on sensing accuracy. In this case, the configuration of the sensor device is the same as the sensor device 300 of FIG. 6. Suppose that, in one or more embodiments of the present invention, for example, only when the measured value of the first sensor unit 101 is in a range of $\alpha_1$ to $\beta_1$, the second sensor unit 301 performs measurement, and in the measurement of the second sensor unit 301, it is desired to perform measurement with a high degree of accuracy by supplying a relatively high voltage.

In the flowchart as illustrated in FIG. 8, first, the device also goes into the sleep mode. More specifically, the control IC 105 turns off the switches SW1 and SW3 and turns on the switch SW2 (S61). Accordingly, the first and second DC converters 104/201 stop, and power is directly provided from the direct current power supply 103 to the first sensor unit 101, the second sensor unit 301, the wireless communication device 102, and the control IC 105 (battery direct connection). Accordingly, the sensor device 300 goes to the sleep mode (S62).

In the sleep mode, the control IC 105 monitors a sensor status signal and a communication device status signal to go into the sensing mode and the transmission mode with appropriate timing. When the sensor status signal is in a measurement standby status, and the sensor measurement start condition is satisfied (Yes in S63), the control IC 105 determines that it is possible to go to the sensing mode, and turns on the switch SW1 and turns off the switches SW2 and SW3 (S64). Accordingly, the first DC converter 104 operates, and power is provided via the first DC converter 104, which is a step-down-type DC converter, to the first sensor unit 101, the second sensor unit 301, the wireless communication device 102, and the control IC 105.

When the device thus goes to the sensing mode, first, the first sensor unit 101 starts measurement operation, and obtains the measured value (S65). Further, a determination is made as to whether the measured value $\gamma_{s1}$ obtained in S65 satisfies $\alpha_1 \leq \gamma_{s1} \leq \beta_1$ (S66).

When $\alpha_1 \leq \gamma_{s1} \leq \beta_1$ is satisfied (Yes in S66), the second sensor unit 301 requires measurement with a high degree of accuracy, and accordingly, the switches SW1 and SW2 are turned off, and the switch SW3 is turned on (S67). Accordingly, the second DC converter 201 operates, and power is provided via the second DC converter 201, which is a step-up-type DC converter, to the first sensor unit 101, the second sensor unit 301, the wireless communication device 102, and the control IC 105.

In this status, the second sensor unit 301 starts the measurement operation, and obtains the measured value (S68). Further, the switch SW1 is turned on and the switches SW2 and SW3 are turned off (S69). Thus, the first DC converter is caused to operate, and the measurement data obtained in S65 and S68 are stored in the memory (S70). When the determination condition is not satisfied in S66, the second sensor unit 301 need not perform the measurement, and accordingly, only the measurement data obtained in S65 are held in the memory (S70).

When the sensing mode is thus finished, a determination is made as to whether it is possible to subsequently go into the transmission mode. When it is determined that it is possible to subsequently go into the transmission mode, processing of the transmission mode is performed (S71 to S72). The processing of S71 to S72 is the same as the processing of S7 to S8 in FIG. 2, and therefore, detailed description thereabout is omitted.

Figure 9:
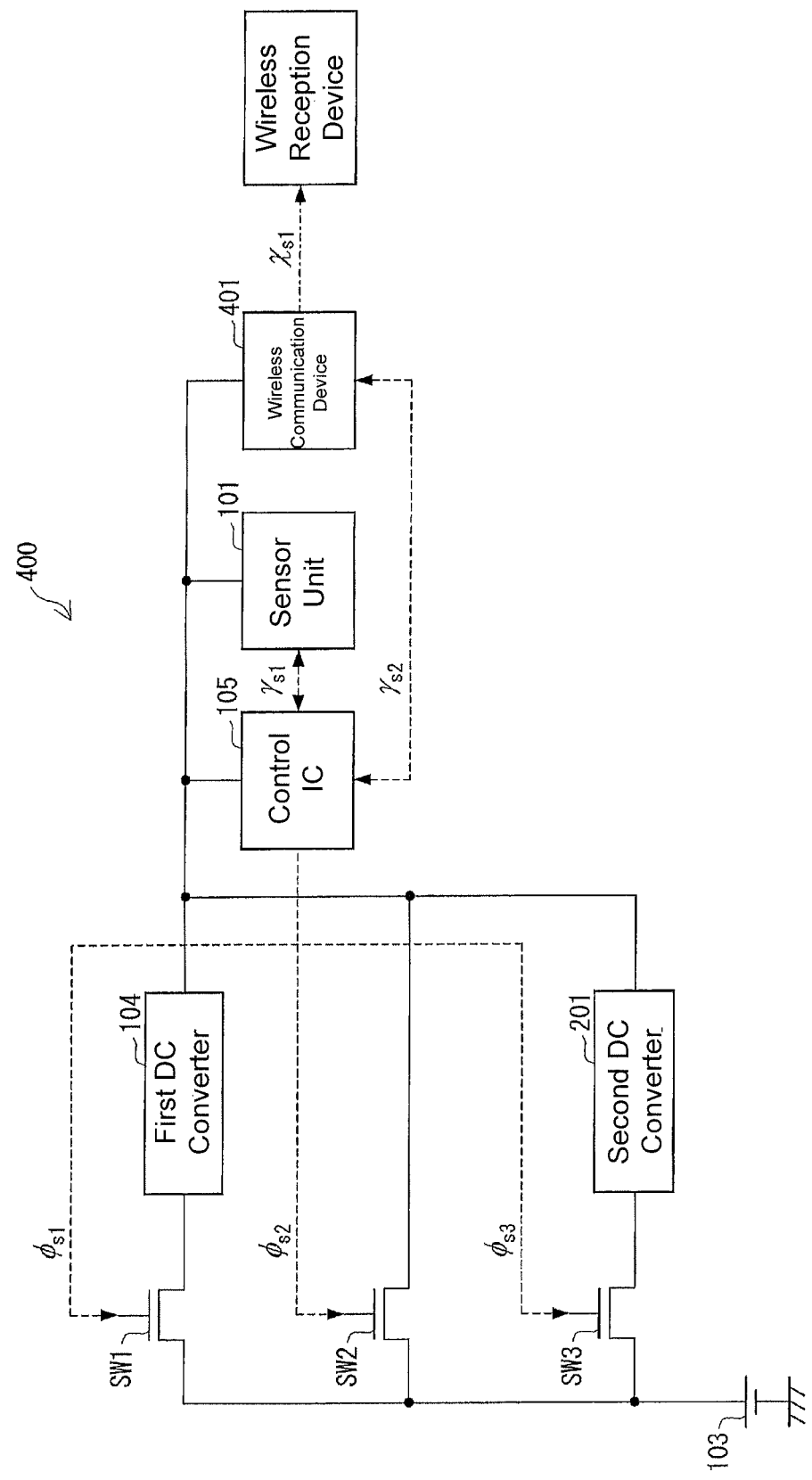
FIG. 9 is a block diagram illustrating schematic configuration of a sensor device according to one or more embodiments of the present invention.

FIG. 9 is a block diagram illustrating schematic configuration of a sensor device according to one or more embodiments of the present invention. When, in particular, this sensor device 400 switches the power supply on the basis of wireless communication quality, the sensor device 200 is configured to be able to obtain a significant effect of reduction of the power consumption. The sensor device 400 of FIG. 9 has a configuration similar to the sensor device 200 of FIG. 4, but is configured such that, instead of the wireless communication device 102, a wireless communication device 401 is provided. In the wireless communication device 401, the wireless communication quality can be changed in accordance with the supply voltage, and the higher the supply voltage is within a defined operation voltage range, the higher the wireless communication quality becomes.

Figure 10:
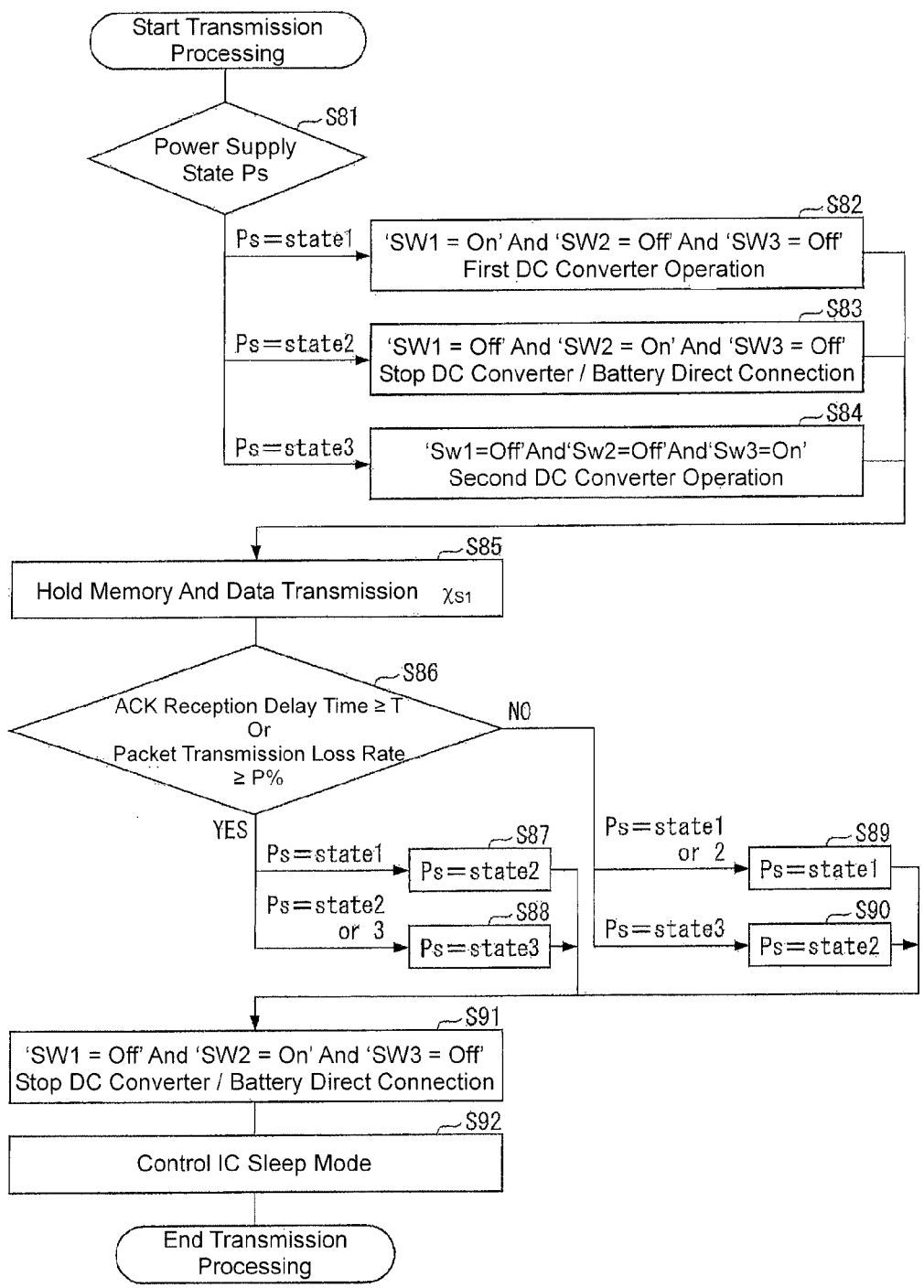
FIG. 10 is a flowchart illustrating power supply switching algorithm according to one or more embodiments of the present invention.

FIG. 10 is a flowchart illustrating algorithm where power supply is switched based on a wireless communication quality. In one or more embodiments of the present invention, the power supply is switched so as to select appropriate wireless communication quality in accordance with the wireless communication status, so that the power consumption can be reduced.

The flowchart as illustrated in FIG. 10 illustrates only power supply switch operation during transmission processing. In S81 to S84, first, initial setting of a power supply state Ps is made. The sensor device 400 can make selection from three power supply states Ps (S81). In the state 1, the switch SW1 is turned on and the switches SW2 and SW3 are turned off (S82). Accordingly, the first DC converter 104 operates, and power is provided via the first DC converter 104, which is a step-down-type DC converter, to the wireless communication device 401. In the state 2, switch SW2 is turned on, switches SW1 and SW3 are turned off (S83). Accordingly, the first DC converter 104 and the second DC converter 201 stop, and power is supplied to the wireless communication device 401 by battery direct connection. In the state 3, switch SW3 is turned on, switches SW1 and SW2 are turned off (S84). Accordingly, the second DC converter 201 operates, and power is provided via the second DC converter 201, which is a step-up-type DC converter, to the wireless communication device 401.

As described above, in the wireless communication device 401, the higher the supply voltage is, the higher the wireless communication quality becomes. The communication quality in the state 1 is the lowest, and the communication quality in the state 3 is the highest. For the sake of explanation, in the flow of FIG. 10, initial setting steps S81 to S84 of the power supply state Ps are placed at first, but actually, the power supply state immediately before the start of the transmission processing may be the initial power supply state as it is.

In the transmission mode, the measurement data held in the memory in accordance with the configured power supply state is wirelessly transmitted (S85). Further, in order to maintain optimum wireless communication quality that is neither too much nor too little, the communication status is monitored during the transmission mode. More specifically, in S86, for example, monitoring is performed to determine whether an ACK reception delay time and a packet transmission loss rate are more than thresholds or not.

The threshold of the ACK reception delay time is denoted as t, and the threshold of the packet transmission loss rate is denoted as p. Where the following expressions hold: the ACK reception delay time $\geq t$ or the packet transmission loss rate $\geq p$ %, it is determined that the wireless communication quality is insufficient with respect to the wireless communication status at that moment, and the power supply state is switched to improve the wireless communication quality. More specifically, when the power supply state at that moment is the state 1, it is switched to the state 2 (S87), when the power supply state at that moment is the state 2, it is switched to the state 3 (S88). When the power supply state at that moment is the state 3, the wireless communication quality cannot be further raised, and therefore, it is still the state 3 (S88).

When none of the following is satisfied: ACK reception delay time $\geq t$ and packet transmission loss rate $\geq p$ %, it is determined that the wireless communication quality is excessive for the wireless communication status at that moment, and the power supply state is switched to reduce the wireless communication quality. More specifically, when the power supply state at that moment is the state 2, it is switched to the state 1 (S89), when the power supply state at that moment is the state 3, it is switched to the state 2 (S90). When the power supply state at that moment is the state 1, the wireless communication quality cannot be further reduced, and therefore, it is still the state 1 (S89).

When the transmission mode is finished, the switch SW2 is turned on, and the switches SW1 and SW3 are turned off, so that the first DC converter 104 and the second DC converter 201 stop (S91), and the device goes into the sleep mode (S92).

Figure 11:
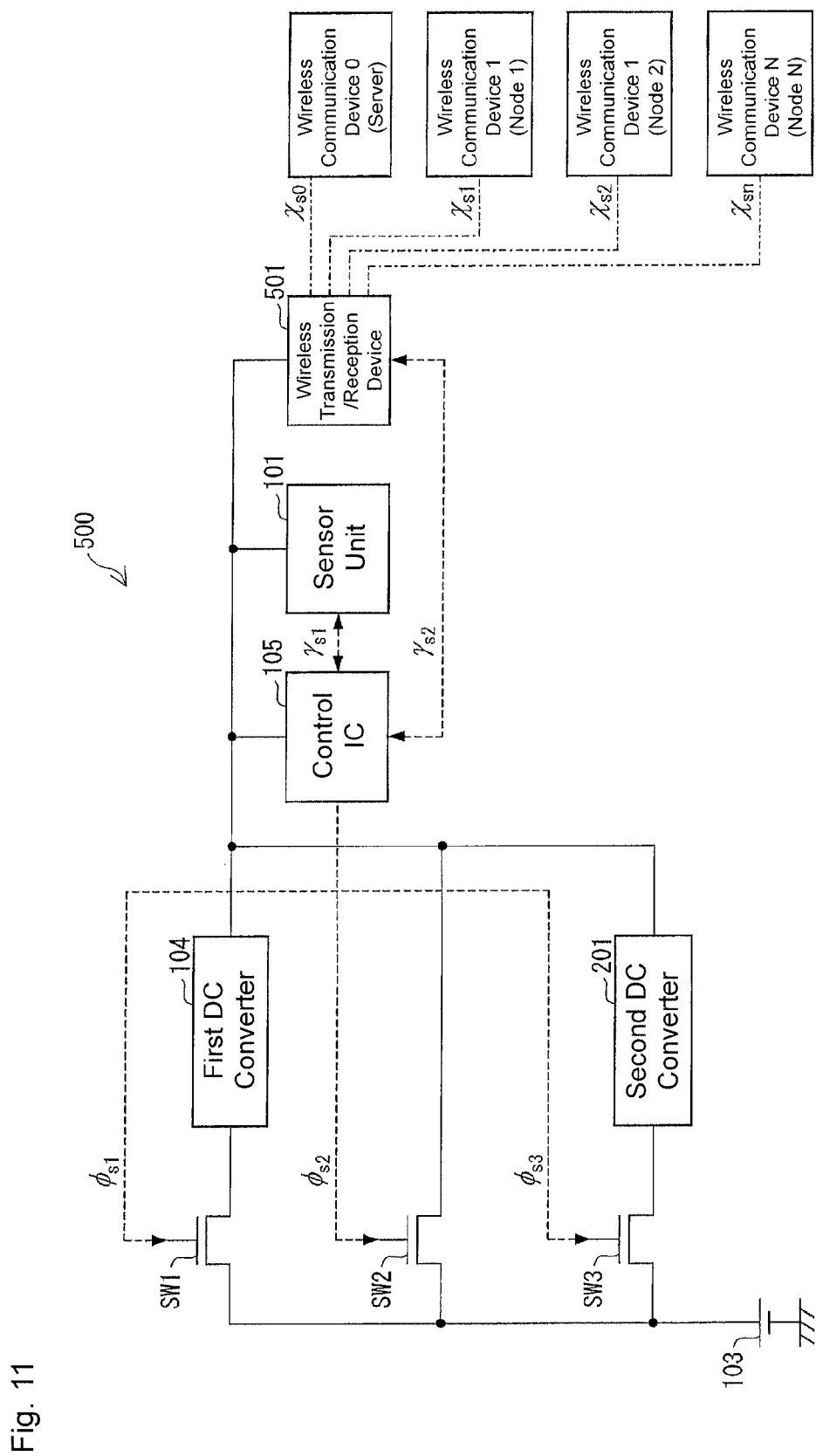
FIG. 11 is a block diagram illustrating schematic configuration of a sensor device according to one or more embodiments of the present invention.

FIG. 11 is a block diagram illustrating schematic configuration of a sensor device according to one or more embodiments of the present invention. When, in particular, this sensor device 500 switches the power supply on the basis of sensing accuracy, the sensor device 500 is configured to be able to obtain a significant effect of reduction of the power consumption. The sensor device 500 of FIG. 11 has a configuration similar to the sensor device 200 of FIG. 4, but is configured such that, instead of the wireless communication device 102, a wireless communication device 501 is provided. More specifically, in one or more embodiments of the present invention, multiple sensor devices are provided in a certain space, and the measurement results from these multiple sensor devices are collected in the server device, and a sensor system for detecting the status in the space is constituted. The sensor device 500 according to one or more embodiments of the present invention is one of the sensor devices constituting the sensor system, and the wireless communication transmission reception device 501 can not only transmit the measured value to the server device but also communicate with another sensor device (another node). The sensor device 500 does not generate, within the node in question, a power supply switch command according to the sensing accuracy, but receives and sets power supply status information of another node in proximity, so that the power supply can be managed on the basis of the prediction.

Figure 12:
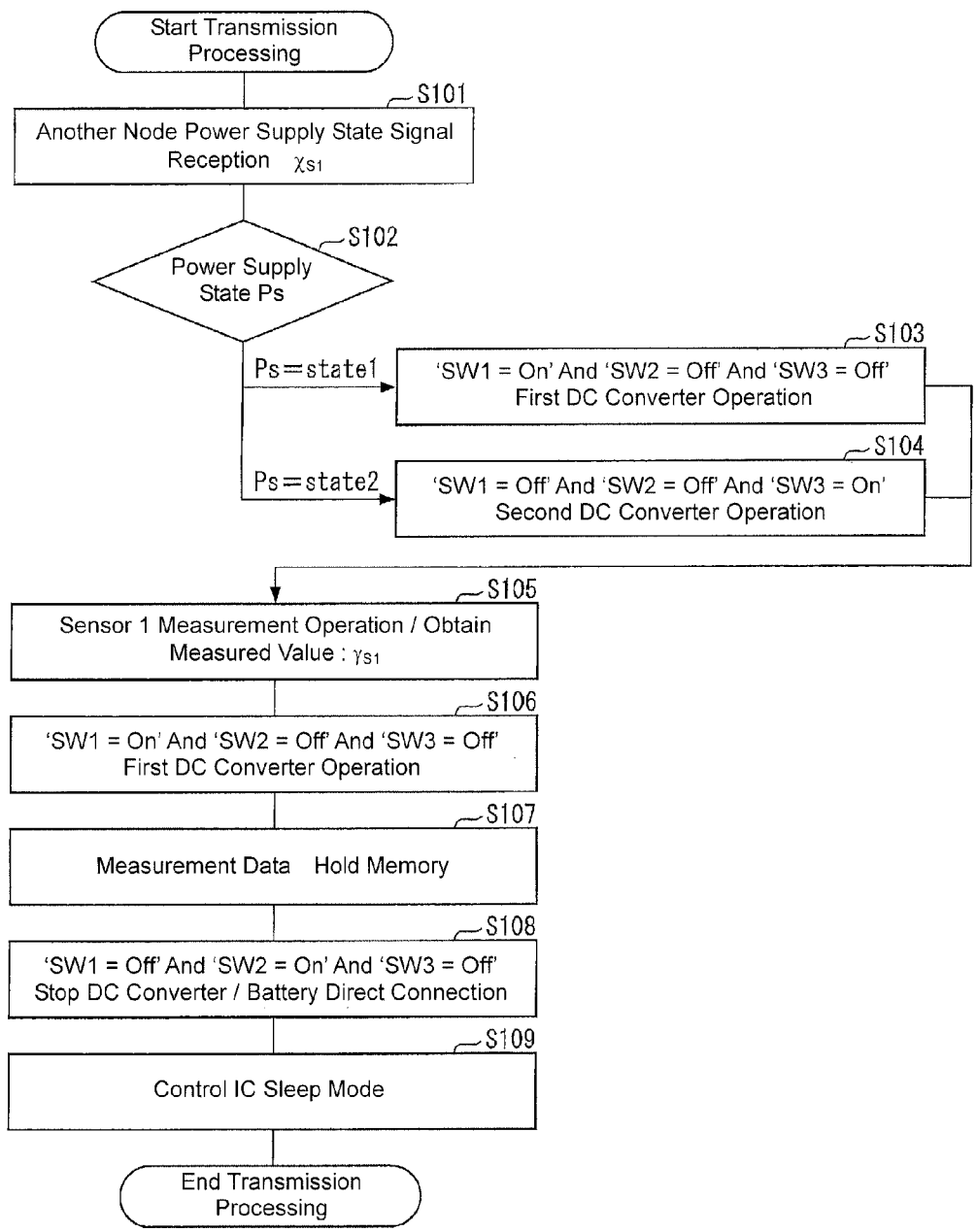
FIG. 12 is a flowchart illustrating power supply switching algorithm according to one or more embodiments of the present invention.

FIG. 12 is a flowchart illustrating algorithm where power supply is switched based on sensing accuracy according to one or more embodiments of the present invention.

The flowchart as illustrated in FIG. 12 illustrates power supply switch operation during measurement processing. In S101 to S84, first, a power supply state signal at another node is received (S101). In this case, the power supply state signal may receive the states from all the other nodes, or may receive a particular node determined in advance (for example, the nearest node, a node installed at a particular position, and the like).

Subsequently, the power supply state of the other node received is determined (S102), and accordingly, the power supply state of the node in question is set (S103, S104). In this case, suppose that the state 1 is a power supply state for operating the first DC converter 104, and the state 2 is a power supply state for operating the second DC converter 201. When the power supply state signals are received from multiple other nodes in S101, the control IC 105 may set the power supply state of the device in accordance with a predetermined algorithm. For example, the power supply state of the node in question may be set in accordance with the largest number of power supply states.

Thereafter, under the power supply state set in S103 or S104, the sensor unit 101 starts the measurement operation, and obtains the measured value (S105). When the measurement is finished, the switch SW1 is turned on and the switch SW2 and the switch SW3 are turned off. Thus, the first DC converter 104 is caused to operate (S106), and the measurement data obtained in S105 are held in the memory (S107).

Then, the switch SW1 and the switch SW3 are turned off, and the switch SW2 is turned on. The DC converter is stopped, and power is supplied by battery direct connection (S108). Then, the device goes to the sleep mode (S109).

The sensor device according to one or more embodiments of the present invention switches the power supply in accordance with the operation mode, and this reduces the power consumption, but the above switching is not performed using the mode signal and the main-driving/standby status signal for setting the mode like Patent Document 1 and Patent Document 2. The sensor device according to one or more embodiments of the present invention is characterized in determining the sensor measurement start condition from the operation status of the device itself, i.e., the output signal of the wireless communication device and the sensor unit, and when the sensor measurement start condition is satisfied, the mode is changed and the power supply is switched. Hereinafter, specific example will be explained with reference to FIG. 13.

Figure 13:
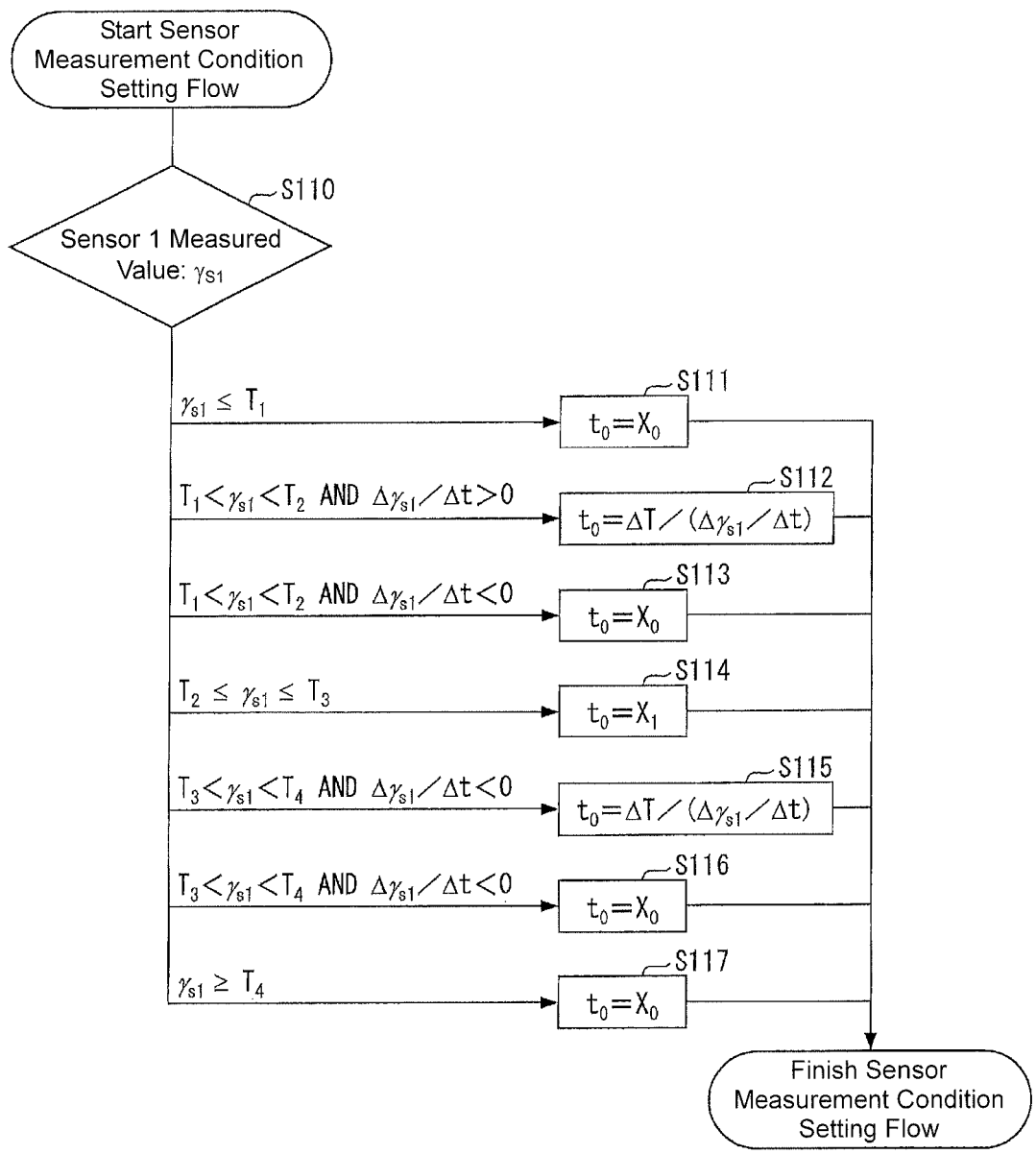
FIG. 13 is a flowchart illustrating determination algorithm of a sensor measurement start condition according to one or more embodiments of the present invention.

Suppose that, in one or more embodiments of the present invention, the sensor device 200 as illustrated in FIG. 4 is used. Suppose that the sensor unit 101 is a temperature sensor, and it is desired to measure with a high degree of accuracy in a range where the temperature is $T_2$ to $T_3$. In a range where the measurement is desired to be performed with a high degree of accuracy, it is desired to increase the measurement frequency. FIG. 13 illustrates an example of determination algorithm of a sensor measurement start condition when these demands exist.

In the determination of the sensor measurement start condition, the measurement time $t_0$ to a subsequent measurement is determined in accordance with the sensor measured value $\gamma_{s1}$ obtained in the last measurement. Then, when the measurement time $t_0$ passes, the subsequent measurement is performed as the sensor measurement start condition is satisfied.

In the flow of FIG. 13, first, the sensor measured value $\gamma_{s1}$ is compared with the threshold (S110). The thresholds used here are four thresholds satisfying the relationship of $T_1 < T_2 < T_3 < T_4$. As described above, the thresholds $T_2$ and $T_3$ represent the measurement ranges in which the measurement is desired to be performed with a high degree of accuracy. It should be noted that $T_1$ and $T_4$ are to set the region for determining the status close to the above measurement range.

When the sensor measured value $\gamma_{s1}$ is compared with the thresholds, and $\gamma_{s1} \leq T_1$ or $\gamma_{s1} \geq T_4$ holds, it is recognized that it is greatly beyond the measurement range in which it is desired to perform the measurement with a high degree of accuracy, and in this case, the measurement time $t_0$ to the subsequent measurement is set to $X_0$ (S111, S117). When $T_2 \leq \gamma_{s1} \leq T_3$ holds, it is recognized that it is within the measurement range in which it is desired to perform the measurement with a high degree of accuracy, and in this case, the measurement time $t_0$ to the subsequent measurement is set to $X_1$ (S114). In this case, in the range in which it is desired to perform the measurement with a high degree of accuracy, there is a demand to increase the measurement frequency, and therefore $X_1$ is set as a time shorter than $X_0$ ($X_1 < X_0$).

When $T_1 < \gamma_{s1} < T_2$ holds, a determination is made as to whether the amount of change of the measured value becomes closer to $T_2$ or becomes away from it. More specifically, when the inclination of the amount of change $\Delta\gamma_{s1}/\Delta t$ is positive, it is recognized that it becomes closer to $T_2$. In order to reliably, accurately perform the measurement in the range of $T_2$ to $T_3$, the measurement time $t_0$ is set as $\Delta T (\Delta\gamma_{s1}/\Delta t)$ (S112). When the inclination of the amount of change $\Delta\gamma_{s1}/\Delta t$ is negative, it is recognized that it becomes away from $T_2$. Then, the measurement time $t_0$ is set to $X_0$ (S113)

Likewise, when $T_3 < \gamma_{s1} < T_4$ holds, a determination is made as to whether the amount of change of the measured value becomes closer to $T_3$ or becomes away from it. More specifically, when the inclination of the amount of change $\Delta\gamma_{s1}/\Delta t$ is negative, it is recognized that it becomes closer to $T_3$. Then, the measurement time $t_0$ is set to $\Delta T (\Delta\gamma_{s1}/\Delta t)$ (S115). When the inclination of the amount of change $\Delta\gamma_{s1}/\Delta t$ is positive, it is recognized that it becomes away from $T_3$. Then, the measurement time $t_0$ is set to $X_0$ (S116).

When the sensor measurement start condition is determined according to the above flow, the measurement can be reliably performed with a high degree of accuracy in a range where it is desired to perform the measurement with a high degree of accuracy, and in the range other than that, the measurement is performed upon reducing the measurement frequency of the measurement accuracy, so that the power consumption can be reduced.

In addition to the measurement accuracy, it is possible to achieve the reduction of the power consumption with switching of the power supply circuit while ensuring the accuracy in the time direction by increasing the operation frequency in the sensor range to be measured, using the same concept for the power supply switch timing during sleeping.

As described above, the sensor device according to one or more embodiments of the present invention is the sensor device having the sensor unit and the control unit, and includes multiple power supply paths from the power supply to the sensor unit and the control unit, wherein these power supply paths can be switched in accordance with the operation status of the sensor unit.

Further, the sensor device has the wireless communication device for transmitting the measurement result of the sensor unit, and the multiple power supply paths are provided to supply power from the power supply to the wireless communication device. Also, the multiple power supply paths are configured to be able to be switched in accordance with the operation status of the wireless communication device.

According to the configuration, the power supply path is switched in accordance with the operation mode of the sensor device (power supply switch), so that an optimum power supply path can be selected, and the power consumption can be reduced. The power supply switch is not to switch the power supply using the mode signal and the main-driving/standby status signal for setting the operation mode, and can be performed in accordance with the operation status of the device itself (the output signal of the wireless communication device and the sensor unit). More specifically, the power consumption can be reduced even though the operation status of the sensor device may change in accordance with, e.g., installation environment.

The sensor device may be configured to switch the power supply path such that, in the operation mode when the consumed electric current is relatively high, the power supply path is a path for providing power via the DC converter, and in the operation mode when the consumed electric current is relatively low, the power supply path is a path for directly connecting the power supply to the load to provide power.

According to, the configuration, in the operation mode when the consumed electric current is relatively high (for example, the sensing mode or the transmission mode), the DC converter can be driven in the status where the electric current conversion efficiency is high. In the operation mode when the consumed electric current is relatively low (for example, the sleep mode), the operation power of the DC converter can be reduced.

The sensor device may be configured to switch the power supply path in accordance with the sensing accuracy of the sensor unit such that, in the measurement range where the sensor unit performs the measurement with a high degree of accuracy, the power supply path is a path for providing power via the step-up-type DC converter, and in the measurement range other than that, the power supply path is a path for providing power via the step-down-type DC converter.

According to the configuration, when an operation voltage is increased in a measurement range where measurement is performed with a high degree of accuracy, measurement error decreases, and the measurement can be performed with a high degree of accuracy, but in the range other than that, a voltage more than necessary is not supplied, and the power consumption is reduced.

The sensor device includes at least first and second sensor units, wherein the first sensor unit performs measurement in a status of supplying power via the step-down-type DC converter, and when a measured value of the first sensor unit is within a predetermined range, the second sensor unit performs measurement in a status of supplying power via the step-up-type DC converter.

According to the configuration, in a desired measurement range, measurement is performed with a high degree of accuracy, and in a range other than that, a voltage more than necessary is not supplied, and the power consumption is reduced.

The sensor device may be configured such that when a measurement frequency with which the sensor unit performs measurement is equal to or less than a threshold, the power supply path is thus switched, and when the measurement frequency is more than the threshold, the power supply path is not switched.

According to the configuration, when the measurement frequency is more than the threshold, and the power supply path is switched frequently, the power consumption caused by switching of the switch is increased, and therefore, the switching is controlled in accordance with the measurement frequency, so that the switch control can be performed only when the switch control is effective for reducing the power consumption.

The sensor device may be configured such that a measurement result from another sensor device is received via the wireless communication device, and the power supply path is switched in accordance with whether the received measured value is in a measurement range where the sensor unit performs measurement with a high degree of accuracy.

According to the configuration, using a measurement result from another sensor device, measurement can be performed with a high degree of accuracy in a desired measurement range, and in a range other than that, a voltage more than necessary is not supplied, and the power consumption is reduced.

The sensor device may be configured such that the wireless communication device monitors a communication status, the power supply path is switched in accordance with the communication status, and power is appropriately supplied in accordance with the communication status.

According to the configuration, for example, when the wireless communication quality is insufficient for the wireless communication status at that moment, the supply voltage is increased, and when the wireless communication quality is excessive, the supply voltage is reduced, so that power that is neither too much nor too little is supplied for the communication status at all times, and useless power consumption can be suppressed while the wireless communication quality is maintained.

The present invention is not limited to the embodiments explained above. The present invention can be changed in various manners as indicated in claims. That is, the technical scope of the present invention also includes embodiments obtained by combining technical means changed as necessary within the scope indicated by claims.

With one or more embodiments of the present invention, the power consumption can be reduced in a sensor device using a finite power supply source such as a battery (the lifetime of the battery is prolonged), and one or more embodiments of the present invention can be applied to a sensor system and the like for wirelessly transmitting a measurement result of a sensor to a server.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

100, 200, 300, 400, 500 sensor device
101, 301 sensor unit
102, 401 wireless communication device
103 direct current power supply
104, 201 DC converter
105 control IC
501 wireless transmission/reception device

The invention claimed is:

1. A sensor device comprising:
   a sensor unit;
   a control unit; and
   multiple power supply paths from a power supply to the sensor unit and the control unit,
   wherein the multiple power supply paths are configured to be switched in accordance with an operation mode of the sensor unit, and
   wherein the sensor device is configured to switch the power supply path such that, in an operation mode when a consumed electric current is high, the power supply path is a path for providing power via a DC converter, and in an operation mode when a consumed electric current is low, the power supply path is a path for directly connecting the power supply to a load to provide power, the multiple power supply paths are configured to be switched in accordance with an operation mode of the sensor unit, and
   wherein the sensor device is configured to switch the power supply path in accordance with sensing accuracy of the sensor unit such that, in a measurement range where the sensor unit performs the measurement with a high degree of accuracy, the power supply path is a path for providing power via a step-up-type DC converter, and in a measurement range other than that,
   the power supply path is a path for providing power via a step-down-type DC converter, the sensor devices comprising
   first and second sensor units,
   wherein the first sensor unit performs measurement in a status of supplying power via the step-down-type DC converter, and
   wherein, when a measured value of the first sensor unit is within a predetermined range, the second sensor unit performs measurement in a status of supplying power via the step-up-type DC converter.

2. The sensor device according to claim 1 further comprising:
   a wireless communication device for transmitting a measurement result of the sensor unit,
   wherein the multiple power supply paths are provided to supply power from the power supply to the wireless communication device, and
   wherein the multiple power supply paths are configured to be switched in accordance with an operation status of the wireless communication device.

3. The sensor device according to claim 2, wherein
   the wireless communication device monitors a communication status, and
   the power supply path is switched in accordance with the communication status, and power is appropriately supplied in accordance with the communication status.

4. The sensor device according to claim 1,
   wherein, when a measurement frequency with which the sensor unit performs measurement is equal to or less than a threshold, the power supply path is thus switched, and
   wherein, when the measurement frequency is more than the threshold, the power supply path is not switched.

5. The sensor device according to claim 1, wherein
   a measurement result from another sensor device is received via the wireless communication device, and
   the power supply path is switched in accordance with whether the received measured value is in a measurement range where the sensor unit performs measurement with a high degree of accuracy.

* * * * *